United States Patent Office 3,793,283
Patented Feb. 19, 1974

3,793,283
IMPACT-IMPROVED POLYPROPYLENE COMPOSITIONS
Nevin E. Frailey, Turnersville, N.J., and Ralph A. Welch, Columbus, Ohio, assignors to Shell Oil Company
No Drawing. Filed Mar. 16, 1972, Ser. No. 235,407
Int. Cl. C08c *11/22;* C08f *19/08*
U.S. Cl. 260—33.6 AQ                               5 Claims

ABSTRACT OF THE DISCLOSURE

The impact resistance of impact-improved compositions of polypropylene modified with added ethylene-propylene elastomers or with 1–20% by weight of appropriately copolymerized ethylene is further substantially improved by the presence of certain block copolymers of mono-alpha-alkenyl arenes and conjugated dienes. The compositions are especially suitable for foam structures.

BACKGROUND OF THE INVENTION

Polypropylene finds many technical and commercial utilities, many of which are limited by the impact strength of the product. The impact strength of commercial polypropylene may be improved to a limited degree by physically incorporating rubbers such as polyisobutylene or ethylene/propylene elastomer in polypropylene. A preferred alternative is to modify polypropylene during polymerization by controlled copolymerization of 1–20% by weight of ethylene with propylene under known conditions, as disclosed, for example, in U.S. Pat. 3,301,921 to Short, or to blend polypropylene with such copolymer products as disclosed in U.S. Pat. 3,354,239 to Short. The exact nature of such copolymerization products will vary depending on the conditions of preparation. Typically, such copolymers comprise block copolymer structures in which random ethylene/propylene copolymer units are attached to one end of polypropylene chains. Unattached random ethylene propylene copolymer molecules may also be present in such products and a portion of the ethylene may be present therein as a dispersed polyethylene phase. Such products are suitably designated, therefore, as "impact-improved polypropylene products modified with 1–20% wt. percent ethylene" or "ethylene-modified, impact-improved polypropylene products." In spite of efforts to impart improved impact resistance to polypropylene, even these impact-improved products are limited in their impact resistance, especially at low temperatures. For some purposes, it would be highly desirable to produce compositions based on polypropylene which would have further improved impact resistance and other associated properties.

As an alternative to impact improvement of polypropylene by incorporation of elastomers such as polyisobutylene or ethylene-propylene copolymers which are vulcanizable to form rubber-like materials, it has been suggested by Pritchard in U.S. Pat. 3,294,868 to incorporate in polypropylene 3 to 35% by weight of styrene-butadiene block polymer of the type described in British Pat. 888,-624, which is a so-called "tapered" block copolymer. The low temperature impact improvement obtained with compositions of the Pritchard invention (by unnotched Izod impact test) is shown in the patent to be of the same order as that obtained with polyisobutylene or ethylene-propylene elastomer.

Elastomeric block copolymers have been investigated in the past few years in great detail. Their properties differ from one another depending upon their macromolecular structure and upon the proportion and identity of the monomers from which the individual blocks are prepared. One type of block polymer which has been investigated, often referred to as a "tapered" block copolymer, is that described, for example, in British Pat. 888,-624, mentioned above. Such tapered block copolymers are normally produced by copolymerization of a mixture of two monomers such as styrene and a conjugated diene. Due to the different polymerization rates, the resulting copolymeric product is said to be a tapered copolymer wherein one end of the polymer chain comprises essentially conjugated diene condensed units followed by a copolymeric section which gradually increases in styrene proportion until all of the diene has been exhausted, after which the tapered polymer normally is terminated with homopolymeric styrene. These tapered polymers are to be sharply distinguished from the type of polymer represented by the structure A-B-A or its branched counterparts, wherein the polymer blocks A are homopolymeric blocks of alkenyl arenes and the block B is a homopolymeric block of a conjugated diene. One of the primary differences between the tapered block copolymers and the A-B-A type block copolymers is that the latter have physical properties such that they are referred to as "thermoplastic elastomers," especially if the monovinyl arene (or other alkenyl arene) content is less than about 55% by weight. Polymers of this type perform as elastomers at room temperature but can be processed in the softened or melt state in equipment designed to handle true thermoplastics. Tapered copolymers, on the other hand, do not possess the characteristics of a thermoplastic elastomer. To be useful as elastomers, they require vulcanization, while the A-B-A type of block copolymers have all the properties of a vulcanized rubber without having been vulcanized. Thus, their physical properties differ sharply from those of the tapered copolymers. Moreover, the low temperature properties and polymer compatibilities differ between the two types of products.

OBJECTS OF THE INVENTION

It is an object of the present invention to improve the properties of polypropylene compositions. It is a special object of the invention to provide polypropylene-based compositions having improved impact resistance and to provide foamed polypropylene-based articles having high impact resistance and high flexibility. It is a particular object of the invention to provide such compositions without material damage to other properties of the composition. Other objects will become apparent during the following detail description of the invention.

STATEMENT OF THE INVENTION

Now, in accordance with the present invention, improved compositions are provided comprising (1) 55–90% by weight of ethylene-modified, impact-improved polypropylene compositions containing 1 to 30% by weight of added impact-improving vulcanizable ethylene-propylene elastomers or 1–20% (preferably 2–15%) by weight block copolymer containing less than about 55% by weight of block copolymer of conjugated diene and mono-alpha-alkenylarene, said block copolymer having no random copolymer blocks, having at least two terminal mono-alpha-alkenylarene homopolymer blocks and at least one conjugated diene homopolymer block, said block copolymer containing less than about 55% by weight of bound mono-alpha-alkenylarene.

Preferably, the improved compositions contains 5 to about 30% by weight of an oil and may contain up to 30% by weight of polystyrene as well as minor amounts of other known components such as fillers, stabilizers, pigments and the like.

In the preferred compositions, the added oil, polystyrene and filler are of the types described in Legge et al., 3,459,830, referred to below and are incorporated with the elastomeric block copolymer, prior to combination of the block copolymer with the impact-modified polypropylene in the following concentrations, expressed in parts by weight per hundred parts of said block copolymer (phr.): extending oil—5–150 and preferably 25–75 phr.; polystyrene—0–125 and preferably 0–90 phr.; fillers—0–150 and suitably 10–75 phr.

The compositions of this invention have remarkably good impact resistance both at room temperature and at temperatures as low as 0° C. while at the same time their other physical properties are satisfactory. The compositions are especially suitable for the formation of foamed articles.

The block copolymers forming the impact improving component of these compositions are described in numerous patents, such as Holden et al. U.S. Pat. 3,265,765 and Legge et al. U.S. Pat. 3,459,830. These patents describe an A-B-A type of block polymer, but the present invention not only contemplates use of polymers of the A-B-A configuration but also the multiblock linear and branched counterparts of these, as described, for example, in U.S. Pat. 3,594,452 to De La Mare. The physical properties of the thermoplastic elastomeric block copolymers depend primarily upon the individual block molecular weights and the monomers from which the various blocks are prepared.

The mono-alpha-alkenyl arenes utilized in the formation of the homopolymeric thermoplastic blocks are typified by styrene, alpha-methyl-styrene, vinyl toluene and tertiary butylstyrene. The homopolymeric blocks prepared from these mono-alpha-alkenylarenes should have average molecular weights in the order of 9,000–40,000, preferably between 9,000 and 25,000.

The conjugated dienes utilized in the formation of the homopolymeric diene blocks which impart elastomeric properties to the block copolymers are preferably butadiene or isoprene. The conjugated diene polymer blocks have average molecular weights between about 35,000 and 150,000, preferably between about 40,000 and 80,000. It is emphasized that the individual polymer blocks are homopolymeric, by which is meant in this instance that the diene blocks are entirely diene, although mixtures of dienes may be present in the single block and that the mono-alpha-alkenylarene blocks are entirely made of mono-alpha-alkenylarenes, even though mixtures of the latter may be present in a single block. With these criteria, the block copolymers will have elastomeric and thermoplastic properties as long as the proportion of the arene blocks is less than about 55% by weight and preferably between about 12 and 40% by weight, still more preferably between about 32 and 35% by weight. Where in the present specification reference is made to average molecular weights, these will be understood to be number average molecular weights of the kind determined by osmotic pressure methods or by tritium counting methods.

While minor variations in composition properties will be found, depending on the precise macromolecular configuration of the block copolymers used in this invention, it will be understood that it is contemplated that linear or branched configurations may be employed. The methods for the preparation of these block copolymers either by an entirely sequential block polymerization process or by a combination of sequential block polymerization and a coupling step are widely described in the patent literature. Reference is made to the Holden patent cited above for a typical sequential process and to the De La Mare patent cited above for preparation of a typical branched polymer.

The polypropylene resins which are modified by block copolymers according to this invention are impact-improved compositions which are either ethylene-modified copolymers or mixtures of homopolymeric and/or copolymeric polypropylene with an impact improving vulcanizable elastomeric ethylene/propylene random copolymer in amounts usually between about 1 and 30 wt. percent. Preferably they are ethylene-modified compositions containing between 1 and 20 wt. percent ethylene units. The nominal melt flow of the polypropylene composition, prior to admixture of block copolymer, may range between about 0.4 and 15, preferably between about 1 and 12 dg./minute. The density may range between about 0.897 and 0.906 grams per cc. at 73° F., while the flex modulus may range between about 125,000 and 250,000 p.s.i.

The polypropylenes may be compounded with the block copolymers by any known means to produce compositions of this invention. Thus, solution processes may be employed for this purpose, but tumbling of pellets or of pellets and block copolymer crumb may be employed prior to a molding operation.

The present invention especially contemplates foamed articles produced from composition of this invention, as by foam molding for the production of articles of lower specific gravity, e.g., between 0.2 and 0.85. A specific case in point is a formation of highway indicator stakes which, when hit by a moving car, merely bend under the car instead of snapping off and thereafter becoming dangerous projectiles. The requirement is, of course, that the stake not only bend temporarily under the impact but that it recover its upright position quickly. The foamed compositions of this invention have been found to be especially promising for this purpose.

Foaming operations as well as other types of molding techniques are well known and are utilized at the present time on a commercial scale.

The foamable composition may comprise as the expanding or foaming agent any known or suitable thermally or chemically decomposable or volatilizable foaming agent. Decomposable foaming agents include organic azo and nitroso compounds, such as an azo-dicarbonamide which decomposes on heating to yield nitrogen, or carbonates or bicarbonates which react with acidic compounds such as citric acid to yield carbon dioxide. Volatilizable foaming agents include volatile, normally-liquid organic substances such as hydrocarbons and halogenated hydrocarbons, e.g., pentanes and fluoroalkanes. A foaming agent which yields nitrogen or carbon dioxide on heating is often preferred as it presents less of a fire hazard.

Any of the well-known chemical blowing agents can be used in the preparation of the foamed articles of this invention as, for example, azobis(formamide), diazoaminobenzene, N,N'-dinitrosopentamethylene tetramine, N,N'-dimethyl - N,N' - dinitrosoterephthalamide, p,p'-oxy-bis (benzene sulfonyl semi-carbazide), azobis(isobutyronitrile), p,p'-oxy-bis(benzene sulfonyl hydrazide), p,p'-diphenyl-bis(sulfonyl hydrazide), benzenesulfonyl hydrazide, m-benzene-bis(sulfonyl hydrazide), etc. Any of the well-known volatile, normally liquid blowing agents may also be used in this invention as, for example, methylchloride, methylene chloride, monochlorotrifluoromethane, dichlorotetrafluoroethylene, trichloroethylene, chloroform, carbon tetrachloride and low boiling hydrocarbons such as butane, pentane, hexane, etc. Accordingly, compounds which decompose or volatilize at a temperature of 190° C. or less to yield at least one mole of gas or vapor per mole of starting compound may be used.

A so-called foam-nucleating agent, which may be a finely divided inert substance such as calcium silicate, may be present, if desired, to aid formation of the desired foam structure.

The foaming agent can be mixed with the composition at any convenient and suitable stage, for example, within the screw plasticizing section of a suitably modified screw preplasticizing injection molding machine in the case of a volatilizable liquid foaming agent, such as pentane; or by homogeneously mixing it with the composition prior to placing it in a mold or feeding it to an injection molding machine in the case of a foaming agent which decomposes on heating to yield a gas or vapor.

The kind of injection molding machinery which can be used in carrying out the present foaming operation can be conventional. For example, suitable machines are available commercially which have a large "shot" capacity and are adapted to permit rapid injection at the charge end of the mold, have provision for closing the injection nozzle at its outlet and at a desired stage in the molding cycle, and have means for retracting the nozzle which can be adjusted to maintain the nozzle in the injection position throughout the molding cycle. Preferably, the injection nozzle is closeable at a position as near as possible to the nozzle outlet. If desired, one can use an injection molding machine having a reservoir into which foamable composition can be fed and wherein it is maintained under pressure sufficient to prevent foaming thereof until enough material to constitute the charge has been built up in the reservoir. The charge is then transferred rapidly from the reservoir to the mold. Suitable injection molding machines may be designed on the basis of the requirements referred to herein, or existing types of machines, where basically suitable, can be modified to meet these requirements, whichever is the more convenient.

The following examples illustrate the benefits gained from the compositions of this invention. In both of the examples, the compositions were foam molded to form placques 315 mils thick using a screw speed of 186 r.p.m. in conjunction with a back pressure of 100 p.s.i. to maximize the homogeneity of the dry-tumbled blends. The conditions of foam molding employed were as follows:

FOAM MOLDING CONDITIONS

Machine _____ Van Dorn, 6 oz.
Cylinder temperature, ° F.:
    Nozzle _____ 430
    Zone 1 _____ 425
    Zone 2 _____ 390
    Zone 3 _____ 385
Mold temperature, ° F., fixed/moving ____ 60/60
Screw speed, r.p.m. _____ 186
Screw back pressure, p.s.i. _____ 100
Injection pressure, p.s.i., high/low _____ 1300/1300
Cycle time, sec.:
    Injection _____ 90
    Booster _____ 1
    Clamp _____ 15
    Open _____ 3.5
    Overall _____ 108.5
    Ram in motion _____ 1
Shot weight, in. of feed, lb. _____ 2–7

The blowing agent employed for this purpose was 1% by weight, based on the total composition of azobis(formamide).

EXAMPLE I

Compositions were prepared from a block copolymer having the structure polystyrene-polybutadiene-polystyrene wherein the bolck molecular weights were 9500–51,500–9500. Two polypropylenes were employed for comparative purposes. The homopolypropylene had a nominal melt flow of 5.0 dg./minutes and a density of 0.905 as well as a flexural modulus of 200,000. The impact polypropylene was an ethylene-modified polypropylene containing 10% by weight of condensed ethylene units. This product has a nominal melt flow of 3.5 dg./minutes and a density of 73° F. of 0.898 g./cc. as well as a flexural modulus of 160,000 p.s.i. The table below illustrates the improvement in impact resistance gained by the use of the block copolymers of this invention and shows the superior properties obtained by the combination of the subject block copolymers with the impact grade of polypropylene.

SUPERIORITY OF IMPACT POLYPROPYLENE VS. HOMOPOLYPROPYLENE

| Sample | Wt. percent | | | Izod impact (unnotched), ft.-lb./in. | |
|---|---|---|---|---|---|
| | Homopolypropylene | Impact polypropylene | Block copolymer | 73° F. | 0° F. |
| A | | 90 | 10 | 6.2 | 4.0 |
| B | | 80 | 20 | 10.1 | 7.7 |
| C | | 60 | 40 | 12.0 | 8.0 |
| D | 80 | | 20 | 6.4 | 3.6 |
| E | 60 | | 40 | 9.5 | 4.1 |
| F | | 100 | | 5.7 | 3.0 |
| G | 100 | | | 4.4 | |

EXAMPLE II

The advantage of adding oil to the blends of the present invention were investigated, the oil being a highly refined "white oil." The same grade of impact polypropylene described in Example I was utilized for this comparison. The block polymer of Sample H was polystyrene-polybutadiene-polystyrene of 14,000–57,000–14,000 block molecular weight. The following table illustrates the advantages gained by the use of the extending oil to improve both the impact resistance and the homogeneity of the composition. The latter aspect is emphasized by the need to properly homogenize the mixture prior to blow molding. It will be noted from the following data that the use of only 10% by weight of oil produced an impact resistance superior to that obtained in similar compositions containing either the same or twice as much block polymer in the absence of oil.

SUPERIORITY OF OIL–MODIFIED BLENDS VS. NON–OILED BLENDS

| Sample | Wt. percent | | | Izod impact, ft.-lb./in. at— | | Screw motor, amps |
|---|---|---|---|---|---|---|
| | Impact polypropylene | Block copolymer | Oil | 73° F. | 0° F. | |
| H | 70 | 20 | 10 | (¹) | 9.7 | 7.0 |
| B | 80 | 20 | | 10.1 | 7.7 | 9.5 |
| C | 60 | 40 | | 12.0 | 8.0 | 10.2 |

¹ Exceeded impact strength limits of test.

We claim as our invention:
1. A composition comprising:
  (a) 55–90% by weight of a polypropylene resin of the group consisting of highly isotactic polypropylene polymer chains uninterrupted by ethylene and having ethylene-propylene copolymer attached to one end of at least a portion of the polypropylene chains, the total amount of ethylene units in the polymer product being in the range from 1 to 20% by weight and the proportion of the ethylene units in said ethylene-propylene copolymer being between 10 and 90% by weight and highly isotactic polypropylene physically blended with 1 to 30% by weight of an impact-improving random ethylene-propylene copolymeric elastomer; and
  (b) 45–10% by weight of a three-block copolymer of conjugated diene and a mono-α-alkenylarene, said copolymer having two terminal mono-α-alkenylarene homopolymer blocks each having an average molecular weight between about 9,000 and about 25,000 separated by one conjugated diene homopolymer block having an average molecular weight between about 40,000 and about 80,000, said block copolymer containing 12–40% by weight of bound mono-α-alkenylarene.

2. A composition according to claim 1 containing in addition at least one of the following components in parts by weight per 100 parts of said block copolymer:
  0–125 parts of polystyrene
  5–150 parts of oil
  0–150 parts of filler.

3. A composition according to claim 1 wherein the alpha-alkenyl arene is styrene and the conjugated diene is butadiene.

4. A composition according to claim 1 wherein the alpha-alkenyl arene is styrene and the conjugated diene is isoprene.

5. A composition according to claim 1 comprising:
(a) ethylene-modified high impact polypropylene containing 2–15 wt. percent ethylene units;
(b) styrene-butadiene-styrene block copolymer;
(c) from 0 to 90 parts, per 100 parts of said block copolymer, of polystyrene having an average molecular weight between 50,000 and 500,000;
(d) from 25 to 75 parts, per 100 parts of said block copolymer, of an extending oil and
(e) from 0 to 75 parts, per 100 parts of said block copolymer, of a filler.

References Cited

UNITED STATES PATENTS

| | | | |
|---|---|---|---|
| 3,301,921 | 1/1967 | Short | 260—876 B |
| 3,354,239 | 11/1967 | Short | 260—897 |
| 3,231,635 | 1/1966 | Holden et al. | 260—880 B |
| 3,294,868 | 12/1966 | Pritchard | 260—45.95 C |
| 3,614,836 | 10/1971 | Snyder et al. | 36—2.5 |
| 3,424,649 | 1/1969 | Nyberg et al. | 260—876 B |
| 3,689,595 | 8/1972 | Gwinn | 260—880 B |

FOREIGN PATENTS

| | | | |
|---|---|---|---|
| 974,460 | 11/1964 | Great Braitain | 260—889 |

OTHER REFERENCES

Raff et al.: High Polymers, vol. 20, Crystalline Olefin Polymers, part 2, pp. 525–528; Interscience, New York (1964).

ALLAN LIEBERMAN, Primary Examiner

H. H. FLETCHER, Assistant Examiner

U.S. Cl. X.R.

260—41.5 R, 876 B, 880 B, 889

UNITED STATES PATENT OFFICE
CERTIFICATE OF CORRECTION

Patent No. 3,793,283     Dated February 19, 1974

Inventor(s) Nevin E. Frailey & Ralph A. Welch

It is certified that error appears in the above-identified patent and that said Letters Patent are hereby corrected as shown below:

Page 1, column 1, under the title, delete "Nevin E. Frailey, Turnersville, New Jersey, and Ralph A. Welch, Columbus, Ohio, assignors to Shell Oil Company" and insert the following -- Nevin E. Frailey, Turnersville, New Jersey, assignor of an undivided interest to Shell Oil Company, and Ralph A. Welch, Columbus, Ohio. --

Signed and sealed this 22nd day of October 1974.

(SEAL)
Attest:

McCOY M. GIBSON JR.
Attesting Officer

C. MARSHALL DANN
Commissioner of Patents